United States Patent
Chen

(10) Patent No.: US 7,842,401 B2
(45) Date of Patent: Nov. 30, 2010

(54) HALOGEN-FREE VARNISH AND PREPREG THEREOF

(75) Inventor: Li-Chun Chen, Taoyuan (TW)

(73) Assignee: ITEQ Corporation, Taoyuan (TW)

( * ) Notice: Subject to any disclaimer, the term of this patent is extended or adjusted under 35 U.S.C. 154(b) by 0 days.

(21) Appl. No.: 12/409,850

(22) Filed: Mar. 24, 2009

(65) Prior Publication Data

US 2010/0248570 A1    Sep. 30, 2010

(51) Int. Cl.
B32B 15/092    (2006.01)
(52) U.S. Cl. .................... 428/626; 442/143; 252/609
(58) Field of Classification Search ........... 428/607, 428/614, 626, 901, 209, 417, 457; 442/110, 442/113, 114, 115, 138, 141, 142, 143; 174/258, 174/259; 252/601, 609
See application file for complete search history.

(56) References Cited

U.S. PATENT DOCUMENTS 6,645,631 B2 * 11/2003 Gan et al. ................... 428/413
2004/0158023 A1 * 8/2004 Hwang et al. ................. 528/87
2004/0166324 A1 * 8/2004 Mishima et al. ............. 428/413
2008/0241578 A1 * 10/2008 Lin et al. .................... 428/626
2009/0176104 A1 * 7/2009 Chen et al. .................. 428/415

FOREIGN PATENT DOCUMENTS

JP    293831    12/1996
JP    583258    4/2004

* cited by examiner

*Primary Examiner*—Arti Singh-Pandey
(74) *Attorney, Agent, or Firm*—Kile Goekjian Reed & McManus PLLC

(57) ABSTRACT

A halogen-free varnish includes epoxy resin, composite curing agent, condensed phosphate, and filler. The composite curing agent includes Benzoxazine (BZ) resin and amino triazine novolac (ATN) resin. The filler has aluminium hydroxide and silica. Glass fabric is dipped into the varnish so as to form a prepreg with better thermal stability, anti-flammability, and low moisture absorption.

14 Claims, No Drawings

HALOGEN-FREE VARNISH AND PREPREG THEREOF

BACKGROUND OF THE INVENTION

1. Field of the Invention

The present invention relates to a halogen-free varnish and a prepreg thereof, in particular to a halogen-free varnish with composite curing agent, condensed phosphate of aromatic compound, and filler; wherein a prepreg may be formed by dipping glass fabrics into the halogen-free varnish.

2. Description of Related Art

Printed circuit board (PCB) is widely used in many applications and fields, for example, electronic devices of electronic products are inserted on PCBs. Now, PCBs are increasingly applied to high power and high thermal environment. Therefore, the study and research on heat-dissipation are developed in order to improve the heat-dissipation efficiency of PCBs.

PCB is made by pressing the prepregs, copper clad laminate (CCL), or copper film. The prepregs are made by dipping glass fabrics into varnish and then curing the fabrics to form thin prepregs.

Regarding environmental protection, halogen-free PCB is more and more developed for electronic application. The curing agent for the epoxy resin used to manufacturing the halogen-free PCB is classified into dicyandiamide and phenol novolac resin systems. The prepreg made of curing agent of dicyandiamide has disadvantage of low heatproof and high moisture absorption. The prepreg made of curing agent of phenol novolac resin system has better properties than the prepreg made of dicyandiamide curing system. However, the curing agent of phenol novolac resin has to be developed to work with the different epoxy resin. Patent NO. TW 293831 disclosed a varnish with Benzoxazine (Bz) resin and condensed phosphate compound in order to manufacture prepregs with anti-flammability property. Further, Patent NO. TW 583258 disclosed a varnish with curing agent of Bz resin and amino triazine novolac (ATN) resin in order to improve the anti-flammability of prepregs. However, Patent NO. TW 583258 disclosed Bz resin of higher parts than ATN resin, and the higher composition of Bz resin results in high glass transition temperature (Tg) and lower moisture absorption, but lower heatproof characteristic (Solder Float Resistance testing). Moreover, the toughness of the prepreg is decreased and the over-addition of Bz resin will decrease the heatproof characteristic Therefore, in view of this, the inventor proposes the present invention to overcome the above problems based on his expert experience and deliberate research.

SUMMARY OF THE INVENTION

The primary object of the present invention is to provide for a halogen-free varnish. The varnish contains composite curing agent so that the prepregs made by the varnish has anti-flammability, heatproof, and low moisture absorption.

The further object of the present invention is to provide for a halogen-free varnish, wherein filler and condensed phosphate are further added in the varnish so as to improve the anti-flammability, heatproof, and low moisture absorption of prepregs made by the varnish.

In order to achieve the above objects, the present invention provides a varnish comprises composition (A): epoxy resin; composition (B): composite curing agent of amino triazine novolac (ATN) resin and Benzoxazine (Bz) resin; composition (C): condensed phosphate; composition (D): filler of aluminium hydroxide and silica.

In order to achieve the above objects, the present invention provides a prepreg with anti-flammability, heatproof, and low moisture absorption properties, and the prepreg is manufactured by dipping glass fabrics into the varnish and then curing the glass fabrics.

Two kinds of curing agent are mixed as a composite curing agent and the composite curing agent is added into a halogen-free varnish. The prepregs are manufacturing by dipping glass fabrics into the varnish, and the prepregs can have anti-flammability and low moisture absorption. Moreover, condensed phosphate with low molecular mass is added into the varnish so that the anti-flammability of the prepregs are further improved.

In order to better understand the characteristics and technical contents of the present invention, a detailed description thereof will be made with reference to accompanying drawings. However, it should be understood that the drawings and the description are illustrative only and are not used to limit the scope of the present invention.

DETAILED DESCRIPTION OF THE PREFERRED EMBODIMENTS

The present invention provides a composite curing agent which is applied for a halogen-free varnish. The halogen-free varnish is used for dipping glass fiber, such as a glass fabric, in order to form prepregs with high heatproof property and low moisture absorption property. Therefore, the prepregs are laminated with the copper layer so as to form laminated plate with high heatproof and low moisture absorption properties. Furthermore, the condensed phosphate of low molecular mass and fillers are added into the halogen-free varnish for improving the high heatproof property and the anti-flammability.

The composite curing agent is obtained by mixing the benzoxazine (BZ) resin and amino triazine novolac (ATN) resin. ATN resin is a copolymer resin with phenol, aldehyde, and compound of thiotrzinone. The phenol can be one of or more than one of bisphenol A, bisphenol F, bisphenol S, cresol, xylenol, phlord, butylphenol, or phenylphenol. Generally speaking, the mixed phenol is used for improving the formability and the anti-flammability of the prepregs. On the other hand, aldehyde may be derivatives such as melamine, fluoranthene; aldehyde may also be derivatives of cyanuric acid or derivatives of isocyanuric Acid. Melamine is selected because of its anti-flammability and cost. A thiotrzinone can be formaldehyde, polyformaldehyde, or trioxane.

Bz resin is a resin with benzoxazine as the primary compound, which has ring-opening polymerization reaction in order to cure. Bz resin has properties of low dielectric loss, high elastic ratio, high heatproof, low moisture absorption, and anti-flammability. The softening point (i.e. softening threshold) of Bz resin is controlled for improving the disadvantage of low toughness and the peeling between layers so that the resin layers have improved contact strength.

The present invention discloses that a composite curing agent which contain the ATN resin and the Bz resin. The composition of the varnish is shown in Table.1.

TABLE 1

|  |  |  | example 1 | example 2 | embodiment 1 |
|---|---|---|---|---|---|
| A. epoxy resin (primary composition) |  |  | 100 | 100 | 100 |
| B1. ATN resin (phr) |  |  | 56 | 53 | 48 |
| B2. Bz resin (phr) |  |  | 0 | 3 | 8 |
| C. condensed phosphate (phr) |  |  | 33 | 33 | 33 |
| D1. aluminium hydroxide (phr) |  |  | 30 | 30 | 30 |
| D2. silica (phr) |  |  | 50 | 50 | 50 |
| moisture absorption test | PCT 121° C./1 hr | % | 0.174 | 0.164 | 0.151 |
| Solder Float Resistance | 288° C. | min | 7~8 | 8~9 | 10 |
| Tg | DMA | ° C. | 171.3 | 173.9 | 174.2 |
| Td (5%) | TGA | ° C. | 378.3 | 374.3 | 373.9 |
| UL94 | Grade |  | V-0 | V-0 | V-0 |

The epoxy resin is the primary composition with 100 parts, the epoxy is two of or more than two of the o-cresol resol epoxy resin, bisphenol. A-novolac epoxy resin, and novolac resin.

The testing data is shown in Table.1 with different ratio of the ATN resin and the Bz resin. The moisture absorption is determined by the water or moisture within the prepregs. The moisture absorption of the prepregs has to be controlled for preventing the situation of de-lamination. In general, the prepregs are inspected by IR or thermogravimetric analysis so as to show the degree of moisture absorption. As shown by Table.1, the moisture absorption decreases form 0.174% to 0.151% when the ratio of ATN resin and the Bz resin adjusts from 56/0 (without Bz resin) to 48/8 (i.e., 6/1).

The result of solder float resistance: the test follows the instruction of IPC-TM-650 Method 2.4.13.1. The method tests heat-dissipation prepregs in 288° C. and counts the time when the prepregs has failed (De-lamination). The results present that the de-lamination time of the prepreg increases from less than 10 minutes to 10 minutes when the ratio of ATN resin and the Bz resin adjusts from 56/0 (without Bz resin) to 48/8 (i.e., 6/1). 10 minutes of de-lamination time is a basic minimum standard for determining the acceptableness of heatproof property.

The test of anti-flammability follows the instruction of UL 94 method. According to the degree of the anti-flammability, the testing results are rated as HB, V-2, V-1, V-0, and 5V so as to represent the anti-flammability of prepregs. The testing prepreg is burned on the fire vertically and follows the following steps. Step 1 is burning the prepreg in fire for 10 seconds and then moving the prepreg away, and simultaneously counting the time period (T1) that the prepreg continues to burn after being removed from the fire. Step 2 is burning the prepreg in fire for 10 seconds again, then moving the prepreg away and simultaneously counting the time period (T2) that the prepreg continues to burn after being removed from the fire. Step 3 is repeating the steps 1 and 2, and calculating the mean value of T1 and T2. Step 4 is summing T1 and T2. According to the specific definition of UL 94, V-0, neither of the mean value of T1 and T2 is larger than 10 seconds, and the sum of T1 and T2 is no greater than 50 seconds. Therefore, the prepregs of examples 1, 2 and embodiment 1 having achieved the standard for V-0 are thus marked as UL 94, V-0.

Depending on the analysis above, the ratio of ATN resin and the Bz resin of 6/1 is a preferable ration to achieve low moisture absorption, high heatproof, and anti-flammability of prepregs.

TABLE 2

|  |  |  | example 7 | example 3 | example 8 | embodiment 1 | example 9 |
|---|---|---|---|---|---|---|---|
| A. epoxy resin (primary composition) |  |  | 100 | 100 | 100 | 100 | 100 |
| B1. ATN resin (phr) |  |  | 36 | 38 | 43 | 48 | 50 |
| B2. Bz resin (phr) |  |  | 20 | 18 | 13 | 8 | 6 |
| C. condensed phosphate (phr) |  |  | 33 | 33 | 33 | 33 | 33 |
| D1. aluminium hydroxide (phr) |  |  | 30 | 30 | 30 | 30 | 30 |
| D2. silica (phr) |  |  | 50 | 50 | 50 | 50 | 50 |
| moisture absorption test | PCT121° C./1 hr | % | 0.173 | 0.175 | 0.174 | 0.151 | 0.171 |
| Solder Float Resistance | 288° C. | min | 10 | 10 | 10 | 10 | 6~7 |
| Tg | DMA | ° C. | 169.2 | 177.9 | 170.7 | 174.2 | 169.9 |
| Td (5%) | TGA | ° C. | 380.3 | 377.9 | 372.3 | 373.9 | 372.2 |
| UL94 | Grade |  | V-0 | V-0 | V-0 | V-0 | V-0 |

Table.2 shows many examples of the present invention, and as shown by Table.2, the ratio of ATN resin and the Bz resin can be 1/1(example 7) to 8/1 (example 9). Furthermore, the ratio of the epoxy resin (i.e., epoxy functional group) and the ATN resin (i.e., hydroxyl functional group) affects the anti-flammability of prepregs. More ATN resin, results in lower anti-flammability performance of prepregs. In example 9, the ratio of the epoxy resin and the ATN resin is 100/50 (2/1) and the time of Solder Float Resistance is 6-7 minutes which did not meet the basic minimum standard. Therefore, the composition of ATN resin is limited so that the ratio of the epoxy resin and the ATN resin has to larger than or equal to 2.

Furthermore, a composition (C): condensed phosphate is added into the halogen-free varnish. The condensed phosphate performs as an anti-flammability compound with lower molecular mass for improving anti-flammability property of prepregs. In an embodiment, a condensed phosphate of aromatic compound with molecular mass less than 600 is used. The condensed phosphate of composition (C) has 25 to 40 parts by weight relative to 100 parts by weight of the composition (A), and more preferably, the condensed phosphate has 33 parts by weight relative to 100 parts by weight of the composition (A). The condensed phosphate of composition (C) has formula of $[OC_6H_3(CH_3)_2]_2P(O)OC_6H_5OP(O)[OC_6H_3(CH_3)_2]_2$.

A composition (D): filler is added into the halogen-free varnish and the filler is applied for improving the anti-flammability, heatproof, and low moisture absorption properties.

In the embodiment, the filler includes aluminium hydroxide and silica. The aluminium hydroxide provides anti-flammability because the material releases water in the crystallization of aluminium hydroxide when aluminium hydroxide is heated. The silica provides heatproof property. Table.3 shows testing results of prepregs with different ratio of aluminium hydroxide and silica. The examples in Table.3 have the same composition of epoxy resin, ATN resin, Bz resin, and condensed phosphate.

Accordingly, the halogen-free varnish comprises composition (A): epoxy resin; composition (B): composite curing agent of ATN resin and Bz resin; composition (C): condensed phosphate; and composition (D): filler of aluminium hydroxide and silica. The composition of additives are further added in the varnish. For example, the additives are accelerator and solvent. The accelerator is isimidazole such as 2-Methyl Imidazole and the solvent is 15-30 parts of MEK, PM, and

TABLE 3

|  |  |  | comparison 1 | comparison 2 | comparison 3 | comparison 5 | embodiment 1 |
|---|---|---|---|---|---|---|---|
| A. epoxy resin (primary composition) |  |  | 100 | 100 | 100 | 100 | 100 |
| B1. ATN resin (phr) |  |  | 48 | 48 | 48 | 48 | 48 |
| B2. Bz resin (phr) |  |  | 8 | 8 | 8 | 8 | 8 |
| C. condensed phosphate (phr) |  |  | 33 | 33 | 33 | 33 | 33 |
| D1. aluminium hydroxide (phr) |  |  | 40 | 0 | 0 | 40 | 30 |
| D2. silica (phr) |  |  | 0 | 40 | 0 | 40 | 50 |
| moisture absorption test | PCT121° C./1 hr | % | 0.183 | 0.181 | 0.183 | 0.169 | 0.151 |
| Solder Float Resistance | 288° C. | min | 4~5 | 10 | 10 | 10 | 10 |
| Tg | DMA | ° C. | 169.7 | 176.8 | 171.7 | 172.8 | 174.2 |
| Td (5%) | TGA | ° C. | 366.1 | 393.2 | 390.8 | 376.1 | 373.9 |
| UL94 Grade |  |  | V-0 | V-1 | V-1 | V-0 | V-0 |

There is no filler added into varnish in comparison3 of Table.3, the degree of the anti-flammability of the prepreg is V-1 and it means the prepreg of comparison3 does not meet the requirement of the anti-flammability for the present, invention. There is only aluminium hydroxide of 40 parts added into varnish (without silica) of comparison1 and the prepreg of comparison1 has V-0 degree of anti-flammability testing (meeting the requirement of anti-flammability of the present invention). However, the time of Solder Float Resistance of comparison1 is about 4-5 minutes which is out of the standard. Alternatively, There is only silica of 40 parts added into varnish (without aluminium hydroxide) of comparison2. The time of Solder Float Resistance of comparison2 is 10 minutes (meeting the requirement of heatproof of the present invention); however the prepreg of comparison2 has V-1 degree of anti-flammability testing, which is out of the standard. On the other hand, the heat stability of prepreg of comparison2 is better than that of prepreg of comparison1 due to the silica. Therefore, the properties of prepreg will not meet the requirements when there is no filler or only one kind of filler is added into varnish. Accordingly, there are aluminium hydroxide of 40 parts and silica of 40 parts added into varnish of comparison5, and both of the heatproof and the anti-flammability properties of prepreg can meet the standard (i.e., V-0 degree of anti-flammability testing, and 10 minutes of Solder Float Resistance testing). Moreover, the ratio of the aluminium hydroxide and silica is adjusted in comparison3 and the testing results of comparison3 show that both of the heatproof and the anti-flammability properties of prepreg can meet the standard and the property of moisture absorption is further improved. The moisture absorption is decreasing from 0.169% of comparison5 to 0.151% of comparison3. Therefore, the composition of filler has 70 to 90 parts by weight relative to 100 parts by weight of the composition of epoxy resin, and more preferably, the composition of filler has 80 parts by weight relative to 100 parts by weight of the composition of epoxy resin. Furthermore, the weight ratio of aluminium hydroxide and silica is 5:3.

cyclohexanone. Table.4 shows the compositions of halogen-free varnish.

TABLE 4

| composition | product | parts |  |
|---|---|---|---|
| epoxy resin | o-cresol | ChangChun CNE200ELF | primary parts | 100 |
|  | resol epoxy resin |  |  |
|  | bisphenol A novolac epoxy resin | ChangChun BNE200A70 (70%) |  |
|  | novolac epoxy resin | ChangChun PNE177 |  |
| curing agent | ATN resin | DAITAC | relative parts | 48 |
|  | BZ resin | Chinyee H3070 | relative parts | 8 |
| condensed phosphate | condensed phosphate of aromatic compound | DAIHACHI PX-200 | relative parts | 33 |
| accelator | isimidazole compound | 2-Methyl Imidazole | relative parts | few |
| filler | aluminium hydroxide |  | relative parts | 30 |
|  | silica |  | relative parts | 50 |
| solvent | MEK, PM, cyclohexanone |  | relative parts | 15-30 |

Accordingly, the glass fabrics are dipped into the varnish comprising composition (A): epoxy resin; composition (B): composite curing agent of ATN resin and Bz resin; composition (C): condensed phosphate; composition (D): filler of aluminium hydroxide and silica; and composition (E): additives. The prepreg made by dipping glass fabrics into the varnish has good heatproof and anti-flammability properties and low moisture absorption.

To sum up, the present invention has following advantages.
1. Two kinds of curing agents (ATN resin and Bz resin) are mixed as a composite curing agent. The composite curing agent is distributed in the varnish so as to improve the anti-flammability of prepreg which is made by dipping glass fabrics into the varnish. Furthermore, the prepreg has low moisture absorption. On the other hand, the condensed phosphate with lower molecular mass is added into the varnish in order to improve the anti-flammability of prepreg.
2. The filler of aluminium hydroxide and silica is added in the varnish and the varnish can be applied for manufacturing prepreg with high anti-flammability, heatproof properties, and low moisture absorption.

Although the present invention has been described with reference to the foregoing preferred embodiment, it shall be understood that the present invention is not limited to the details thereof. Various equivalent variations and modifications may occur to those skilled in this art in view of the teachings of the present invention. Thus, all such variations and equivalent modifications are also embraced within the scope of the present invention as defined in the appended claims.

What is claimed is:

1. A halogen-free varnish, comprising:
   composition (A): epoxy resin;
   composition (B): composite curing agent, wherein the composite curing agent includes benzoxazine resin and amino triazine novolac resin, the benzoxazine resin and amino triazine novolac resin are mixed in a predetermined weight ratio from 1:1 to 1:8;
   composition (C): condensed phosphate; and
   composition (D): filler, wherein the filler includes aluminium hydroxide and silica.

2. The halogen-free vanish according to claim 1, wherein the predetermined weight ratio of the amino triazine novolac resin and benzoxazine resin is 6.

3. The halogen-free varnish according to claim 1, wherein a weight ratio of composition (A) and the amino triazine novolac resin of composition (B) is larger than or equal to 2.

4. The halogen-free varnish according to claim 3, wherein the condensed phosphate of composition (C) has molecular mass less than 600.

5. The halogen-free varnish according to claim 4, wherein the condensed phosphate of composition (C) has 25 to 40 parts by weight relative to 100 parts by weight of the composition (A).

6. The halogen-free vanish according to claim 5, wherein the condensed phosphate of composition (C) has 33 parts by weight relative to 100 parts by weight of the composition (A).

7. The halogen-free varnish according to claim 6, wherein the condensed phosphate of composition (C) has formula of $[OC_6H_3(CH_3)_2]_2P(O)OC_6H_5OP(O)[OC_6H_3(CH_3)_2]_2$.

8. The halogen-free varnish according to claim 5, wherein the filler of composition (D) has 70 to 90 parts by weight relative to 100 parts by weight of the composition (A).

9. The halogen-free vanish according to claim 8, wherein the weight ratio of aluminium hydroxide and silica is 5:3.

10. The halogen-free varnish according to claim 9, further comprising composition (D) of additives.

11. The halogen-free varnish according to claim 10, wherein the additives include accelerator and solvent.

12. The halogen-free varnish according to claim 11, wherein the accelerator is imidazole compounds.

13. The halogen-free varnish according to claim 1, wherein the epoxy resin is two of or more than two of o-cresol resol epoxy resin, bisphenol A-novolac epoxy resin, and novolac resin.

14. A prepreg being manufactured by dipping glass fabrics into the halogen-free varnish of claim 1.

* * * * *

(12) INTER PARTES REEXAMINATION CERTIFICATE (1033rd)
United States Patent
Chen

(10) Number: US 7,842,401 C1
(45) Certificate Issued: Jan. 21, 2015

(54) HALOGEN-FREE VARNISH AND PREPREG THEREOF

(75) Inventor: Li-Chun Chen, Taoyuan (TW)

(73) Assignee: ITEQ Corporation, Ping Chen, Taoyuan (TW)

Reexamination Request:
No. 95/002,297, Sep. 14, 2012

Reexamination Certificate for:
Patent No.: 7,842,401
Issued: Nov. 30, 2010
Appl. No.: 12/409,850
Filed: Mar. 24, 2009

(51) Int. Cl.
*B32B 15/092* (2006.01)

(52) U.S. Cl.
USPC .................. 428/626; 442/143; 252/609

(58) Field of Classification Search
None
See application file for complete search history.

(56) References Cited

To view the complete listing of prior art documents cited during the proceeding for Reexamination Control Number 95/002,297, please refer to the USPTO's public Patent Application Information Retrieval (PAIR) system under the Display References tab.

*Primary Examiner* — Jerry D Johnson

(57) ABSTRACT

A halogen-free varnish includes epoxy resin, composite curing agent, condensed phosphate, and filler. The composite curing agent includes Benzoxazine (BZ) resin and amino triazine novolac (ATN) resin. The filler has aluminium hydroxide and silica. Glass fabric is dipped into the varnish so as to form a prepreg with better thermal stability, anti-flammability, and low moisture absorption.

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 5, lines 28-67:

There is no filler added into varnish in [comparison3] *comparison 3* of [Table.3] *Table 3*, the degree of the anti-flammability of the prepreg is V-1 and it means the prepreg of [comparison3] *comparison 3* does not meet the requirement of the anti-flammability for the present invention. There is only aluminium hydroxide of 40 parts added into varnish (without silica) of [comparison1] *comparison 1* and the prepreg of [comparison1] *comparison 1* has V-0 degree of anti-flammability testing (meeting the requirement of anti-flammability of the present invention). However, the time of Solder Float Resistance of [comparison1] *comparison 1* is about 4-5 minutes which is out of the standard. Alternatively, [There] *there* is only silica of 40 parts added into varnish (without aluminium hydroxide) of [comparison2] *comparison 2*. The time of Solder Float Resistance of [comparison2] *comparison 2* is 10 minutes (meeting the requirement of heatproof of the present invention); however the prepreg of [comparison2] *comparison 2* has V-1 degree of anti-flammability testing, which is out of the standard. On the other hand, the heat stability of prepreg of [comparison2] *comparison 2* is better than that of prepreg of [comparison1] *comparison 1* due to the silica. Therefore, the properties of prepreg will not meet the requirements when there is no filler or only one kind of filler is added into varnish. Accordingly, there are aluminium hydroxide of 40 parts and silica of 40 parts added into varnish of [comparison5] *comparison 5*, and both of the heatproof and the anti-flammability properties of prepreg can meet the standard (i.e., V-0 degree of anti-flammability testing, and 10 minutes of Solder Float Resistance testing). Moreover, the ratio of the aluminium hydroxide and silica is adjusted in [comparison3] *comparison 3* and the testing results of [comparison3] *comparison 3* show that both of the heatproof and the anti-flammability properties of prepreg can meet the standard and the property of moisture absorption is further improved. The moisture absorption is decreasing from 0.169% of [comparison5] *comparison 5* to 0.151% of [comparison3] *comparison 3*. Therefore, the composition of filler has 70 to 90 parts by weight relative to 100 parts by weight of the composition of epoxy resin, and more preferably, the composition of filler has 80 parts by weight relative to 100 parts by weight of the composition of epoxy resin. Furthermore, the weight ratio of aluminium hydroxide and silica is [5:3] *3:5*.

AS A RESULT OF REEXAMINATION, IT HAS BEEN DETERMINED THAT:

Claims 3, 4 and 9 are cancelled.

Claims 1, 5 and 10 are determined to be patentable as amended.

Claims 2, 6, 7, 8 and 11-14, dependent on an amended claim, are determined to be patentable.

1. A halogen-free varnish, comprising:
   composition (A): epoxy resin;
   composition (B): composite curing agent, wherein the composite curing agent includes benzoxazine resin and amino triazine novolac resin, the benzoxazine resin and amino triazine novolac resin are mixed in a predetermined weight ratio from 1:1 to 1:8,
   *wherein a weight ratio of composition (A) and the amino trizaine novolac resin of composition (B) is larger than or equal to 2*;
   composition (C): condensed phosphate; and
   composition (D): filler, wherein the filler includes [aluminium] *aluminum* hydroxide and silica, *the ratio of aluminum hydroxide to silica being 3:5*.

5. The halogen-free varnish according to claim [4] *1*, wherein the condensed phosphate of composition (C) has 25 to 40 parts by weight relative to 100 parts by weight of the composition (A).

10. The halogen-free varnish according to claim [9] *1*, further comprising composition ([D] *E*) of additives.

\* \* \* \* \*